US012654589B2

(12) United States Patent
Vilar et al.

(10) Patent No.: US 12,654,589 B2
(45) Date of Patent: Jun. 16, 2026

(54) POWER SUPPLY FOR ELECTRIC VEHICLES

(71) Applicant: Deere & Company, Moline, IL (US)

(72) Inventors: Eric Vilar, Dubuque, IA (US);
Rushikesh R. Jadhav, Parbhani (IN)

(73) Assignee: Deere & Company, Moline, IL (US)

( * ) Notice: Subject to any disclaimer, the term of this patent is extended or adjusted under 35 U.S.C. 154(b) by 37 days.

(21) Appl. No.: 18/745,501

(22) Filed: Jun. 17, 2024

(65) Prior Publication Data

US 2025/0381881 A1 Dec. 18, 2025

(51) Int. Cl.
B60L 58/12 (2019.01)
B60L 53/16 (2019.01)
B60L 53/35 (2019.01)

(52) U.S. Cl.
CPC .............. B60L 58/12 (2019.02); B60L 53/16 (2019.02); B60L 53/35 (2019.02); *B60L 2200/40* (2013.01); *B60L 2240/545* (2013.01); *B60L 2240/549* (2013.01)

(58) Field of Classification Search
CPC .......... B60L 58/12; B60L 53/35; B60L 53/16; B60L 2200/40; B60L 2240/545; B60L 2240/549
USPC .......................................................... 701/22
See application file for complete search history.

(56) References Cited

U.S. PATENT DOCUMENTS

2018/0290561 A1 * 10/2018 Baumgärtner ........ B60L 53/126
2020/0317077 A1 * 10/2020 Schaffer ................ B60L 53/305

2021/0046829 A1 * 2/2021 Gaither ................... B60L 53/80
2021/0281098 A1 * 9/2021 Ozaki .................... A47L 9/2873
2023/0113279 A1 * 4/2023 Romero .................. B60L 58/12
701/50
2024/0010081 A1 * 1/2024 Williams .............. B60L 53/665
2024/0083265 A1 * 3/2024 Takaki .................... B60L 58/14
2024/0332970 A1 * 10/2024 Gorman ................... B60L 7/10
2025/0108716 A1 * 4/2025 Alarcon .................. B60L 58/12

FOREIGN PATENT DOCUMENTS

CN 117656880 A * 3/2024 ............. B60L 53/11

OTHER PUBLICATIONS

CN-117656880-A (Year: 2024).*

* cited by examiner

*Primary Examiner* — Kenneth M Dunne
*Assistant Examiner* — Brian K Palmarchuk
(74) *Attorney, Agent, or Firm* — Hanley, Flight & Zimmerman, LLC

(57) ABSTRACT

Systems, apparatus, articles of manufacture, and methods are disclosed that determine a charge request for an electric vehicle from a mobile energy unit or mobile charging station. An example vehicle includes a battery, machine readable instructions, and at least one processor circuit to be programmed by the machine-readable instructions to: calculate a deficit of charge current of the battery based on an allowable charge current and a measured charge current; determine a target charge current based on a status of the battery; determine a charge request based on the deficit and the target charge current; and communicate the charge request to a mobile energy unit.

20 Claims, 7 Drawing Sheets

POWER SUPPLY FOR ELECTRIC VEHICLES

FIELD OF THE DISCLOSURE

This disclosure relates generally to electric vehicles and, more particularly, to power supply for electric vehicles.

BACKGROUND

Electric vehicles are typically charged at stationary charging stations. When charging at stationary charging stations, electric vehicles are typically not in use.

SUMMARY

Systems, apparatus, articles of manufacture, and methods are disclosed that determine a charge request for an electric vehicle from a mobile energy unit or mobile charging station. An example vehicle includes a battery, machine readable instructions, and at least one processor circuit to be programmed by the machine-readable instructions to: calculate a deficit of charge current of the battery based on an allowable charge current and a measured charge current; determine a target charge current based on a status of the battery; determine a charge request based on the deficit and the target charge current; and communicate the charge request to a mobile energy unit.

An example non-transitory machine readable storage medium includes instructions to cause at least one processor circuit to at least: calculate a deficit of charge current of a battery of a vehicle based on an allowable charge current and a measured charge current; determine a target charge current based on a status of the battery; determine a charge request based on the deficit and the target charge current; and communicate the charge request to an external power source.

An example system includes a vehicle including a battery, one or more work functions to consume charge from the battery, machine readable instructions, and at least one processor circuit to be programmed by the machine-readable instructions to: calculate a deficit of charge current of the battery based on an allowable charge current and a measured charge current into terminals of the battery; determine a target charge current based on a status of the battery; and determine a charge request based on the deficit and the target charge current. The example system also includes a mobile energy unit coupled to the vehicle to provide energy to the vehicle based on the charge request.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Electric vehicles are also known as battery powered vehicles and/or E-power equipment. Electric vehicles are used in many industries including, for example, the construction and/or agricultural industries. Electric vehicles disclosed herein include any type of electric vehicle including heavy work vehicles such as, for example, backhoes, excavator machines, trenchers, compact wheel or track loaders, grading machines, dump trucks, sprayers, tractors, harvesting equipment, reel mowers, fell bunchers, knuckle-boom loaders, bulldozers, etc.

Battery units in electric vehicles are typically recharged at stationary charging stations. To use a stationary charging station, the electric vehicle is moved into proximity with the stationary charging station and plugged in to receive power from the power source of the stationary charging station. When the electric vehicle is moved into proximity with the stationary charging station, the electric vehicle is typically removed from the work site (e.g., field, construction site, etc.) and, thus, is pulled from service. Even if a stationary charging station is available at a work site, the relatively lengthy charging time for batteries results in downtime for the electric vehicle.

Disclosed herein are portable or mobile charging stations also referred to as mobile energy units and/or external power sources. In some examples, a mobile energy unit is tethered to and pulled by an electric vehicle. In some examples, a mobile energy unit is self-propelled and follows the electric vehicle. The mobile energy unit enables the electric vehicle to be recharged at a work site. In addition, examples disclosed herein enable dynamic control of the power exchange from the mobile energy unit to the electric vehicle. Also, examples disclosed herein enable operation of workloads or work functions of the electric vehicle during a charging session.

Figure 1:
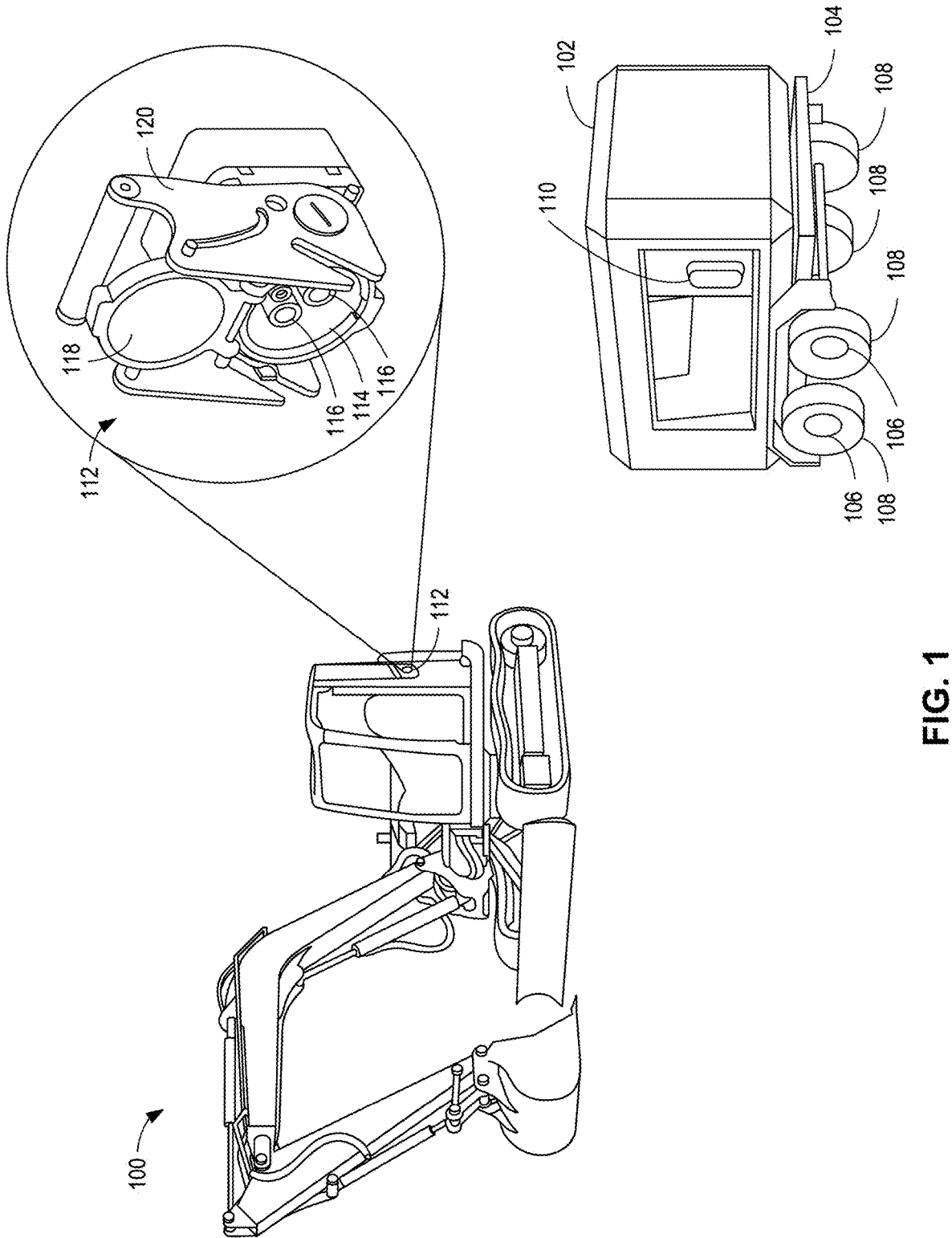
FIG. 1 is a schematic illustration of an example electric vehicle and an example mobile energy unit in accordance with teachings of this disclosure.

FIG. 1 is a schematic illustration of an example electric vehicle 100 and an example external power source or mobile energy unit 102 in accordance with teachings of this disclosure. In this example, the electric vehicle 100 is an excavator that may be used in agriculture, construction, and/or other uses. In other examples, the electric vehicle 100 may be other types of vehicles including those mentioned above.

The mobile energy unit 102 is a power source that is movable over terrain so that the mobile energy unit 102 can be placed in proximity with the electric vehicle 100. In the illustrated example, the mobile energy unit 102 includes an example platform 104 that supports the mobile energy unit 102 on two example axles 106. Each axle 106 is coupled to two example wheels 108. Other examples include other number of axles and/or other numbers of wheels. Also, some examples include a tracks for propelling the mobile energy unit 102. In some examples, the mobile energy unit 102 is tethered to the electric vehicle 100 and pulled by the electric vehicle 100 as the electric vehicle 100 moves. In some examples, the mobile energy unit 102 is self-propelled (e.g., the mobile energy unit 102 includes a motor and one or more powered axels) and is virtually towed by the electric vehicle 100. In some examples, the mobile energy unit 102 and the electric vehicle 100 share location information so the mobile energy unit 102 can navigate the terrain and be in proximity to the electric vehicle 100. In some examples, the mobile energy unit 102 uses radio, telematics, visual systems, radar, lidar, and/or other communication inputs to identify the location of the electric vehicle 100.

During a charging session, the electric vehicle 100 and the mobile energy unit 102 are coupled. In the illustrated example, the mobile energy unit 102 includes an example plug 110 that is insertable or otherwise couplable to an example port 112 of the electric vehicle 100. The port 112 is shown enlarged in the encircled area of FIG. 1. The port 112 includes an example opening 114 with example connectors 116 that engage complementary features on the plug 110. The port 112 also includes an example cover 118 to close the opening 114 when the port 112 is not in use for a charging session.

Conventional plugs (e.g., Combined Charging System Type 1 (CCS1) plugs) are designed for stationary charging and are not mechanically robust for in-field operation. In contrast, the plug 110 and port 112 of the illustrated example are mechanically robust. For example, the port 112 also includes example bracing 120 to ruggedize the connection of the plug 110 and the port 112. Ruggedization is the strengthening of the connection of the plug 110 and the port 112 to enhance resistance to wear, stress, and/or abuse. As disclosed herein, the electric vehicle 100 may remain in operation during a charging session with the mobile energy unit 102. The ruggedization of the connection of the plug 110 and the port 112 helps maintain the coupling of the plug 110 with the port 112 and reduce the likelihood of the plug 110 becoming detached from the port 112 while the electric vehicle 100 is in operation. Other hardware components may be used in additional or alternatively to the bracing 120 to ruggedize the connection of the plug 110 and the port 112.

Figure 2:
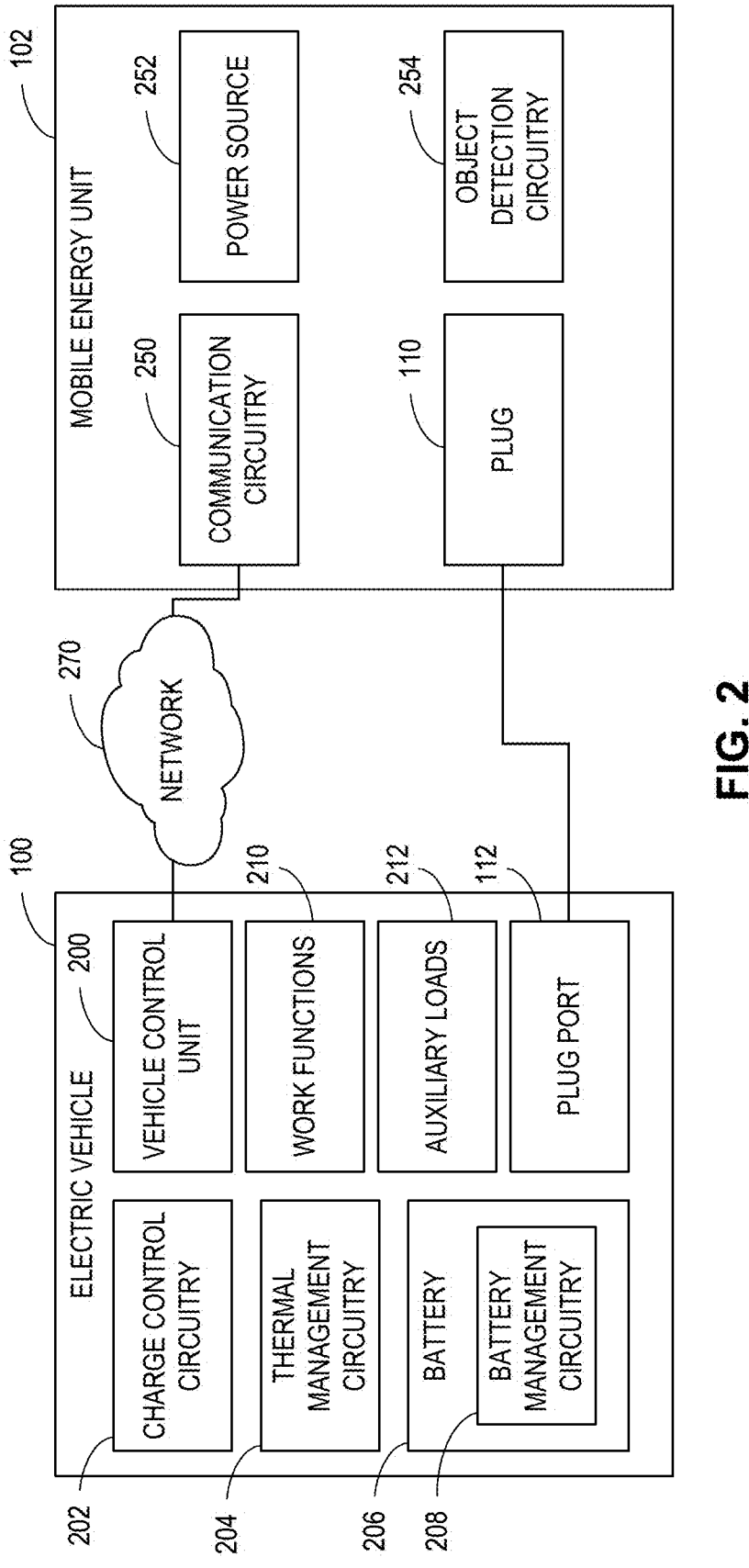
FIG. 2 is a block diagram of an example implementation of the electric vehicle and mobile energy unit of FIG. 1.

FIG. 2 is a block diagram of an example implementation of the electric vehicle 100 and the mobile energy unit 102 of FIG. 1. The electric vehicle 100 includes an example vehicle control unit 200, example charge control circuitry 202, example thermal management circuitry 204, an example battery 206 with example battery management circuitry 208, example work functions 210, example auxiliary loads 212, and the plug port or simply port 112. The mobile energy unit 102 includes example communication circuitry 250, an example power source 252, example object detection circuitry 254, and the plug 110.

The vehicle control unit 200 controls powertrain functions of the electric vehicle 100. The vehicle control unit 200 also controls the work functions 210 including, for example, power output for attachments of the electric vehicle 100 such as, for example, a boom, a bucket, a rotating shaft, a hydraulic port, other power take off functions. The vehicle control unit 200 also controls the auxiliary loads 212 including, for example, thermal systems, operator cabin heat and/or air conditioning, seat warmer for the operator, cabin and external lights, window defrost, radio, wireless communications, system monitors, etc. The vehicle control unit 200 also communicates with the mobile energy unit 102. In some examples, the vehicle control unit 200 communicates with the mobile energy unit 102 wirelessly over a network 270. In some examples, the network 270 is the internet or other network using wireless communication protocols such as, radio, Bluetooth, etc. In some examples, the vehicle control unit 200 communicates with the mobile energy unit 102 via wired connection.

The charge control circuitry 202 operates or implements a charging scheme to regulate current from the power source 252 of the mobile energy unit 102 to battery 206 of the electric vehicle 100. The charging scheme operated by the charge control circuitry 202 balances load distribution among the work functions 210, the auxiliary loads, and/or the charging of the battery 206 during a charging session.

The battery management circuitry 208 determines or measures the battery charge current of the battery 206. Charge current is the amount of current used to charge the battery 206. The charge current is based on the state of the battery 206. The state of the battery or state of charge (SOC) is the charging profile of the battery 206 indicative of the percentage of capacity of the battery 206 that is charged. In other words, the SOC quantifies the remaining capacity available in a battery at a given time. The SOC is usually expressed as percentage (0%=empty; 100%=full). The charge current is typically a percentage of the capacity of the battery. For example, the charge current may be 10%-40% of the capacity of the battery. If, in this example, the battery 206 has a capacity of 1000 milliamp-hours (mAh), the battery 206 has a charge current of 100 milliamps (mA) to 400 mA.

The battery management circuitry 208 also determines or identifies an allowable charge current for the battery 206. The allowable charge current is the rate at which the battery 206 can receive charge at a particular time to achieve full voltage or a fully charged battery.

The charge control circuitry 202 identifies or calculates a deficit of current charge. The deficit of current charge is the difference between the allowable charge current and a measured charged current into terminals of the battery 206, which was obtained from or communicated by the battery management circuitry 208. The charge control circuitry 202 determines a target charge current based on present and planned use of the battery 206. The charge control circuitry 202 maintains a buffer in the SOC of the battery 206 so that the battery 206 does not reach too high of a capacity. If the battery 206 operates at too high of capacity, there is a risk of overcharging or over-discharging, which can cause irreversible degradation of the battery 206. The target charge current is based on battery status including an SOC range of the battery 206, a voltage range of the battery 206, and a temperature range of the battery 206. The temperature range is a factor because the amount of available charge current is reduced in batteries that are too hot or too cold.

The charge control circuitry 202 determines a charge request based on the operating status and target operation of the electric vehicle 100 to determine if the battery 206 should be charged at a maximum possible rate or at a reduced rate. At a higher charge rate, the battery 206 receives more power from the power source 252 at a faster rate, which can increase the operating capability of the electric vehicle 100. At a reduced charge rate, the battery 206 receives power more slowly from the power source 252, which facilitates thermal management because heat generated during a charging session can dissipate more readily when the heat is generated more slowly.

The charge request is based on a comparison of the deficit of charge current and the target charge current. The charge control circuitry 202 determines the charge request based on the minimum or lesser of the deficit of charge current and the target charge current, which is a function of the battery status. For example, if 80% represents the top target operating range for the battery 206, and the SOC of the battery 206 is 80%, the battery 206 seeks 0 mA in additional charge current. In this example, if the deficit of charge current determined by the charge control circuitry 202 based on the measured charge current and the allowable charge current is 100 mA, the charge control circuitry 202 determines the charge request based on the minimum or lesser of the two values of the deficit of charge current and the target charge current. Thus, in this example, the charge control circuitry 202 adjusts or sets the charge request to 0 mA.

In another example, the battery status may indicate that the battery 206 is at a temperature below a threshold temperature and the charge current for this example could be 150 mA. In this example, if the deficit of charge current determined by the charge control circuitry 202 based on the measured charge current and the allowable charge current is 100 mA, the charge control circuitry 202 determines the charge request based on the minimum or lesser of the deficit of charge current and the target charge current, which is a function of the battery status. Thus, in this example, the charge control circuitry 202 sets the charge request to 100 mA.

The thermal management circuitry 204 activates heating or cooling of the components of the electric vehicle 100 including, for example, the powertrain, the cabin, and the battery 206. The thermal management circuitry 204 detects the temperature of the battery 206 and effects heating of the battery (e.g., in freezing temperatures and/or when the temperature of the battery 206 is below a low temperature threshold) and/or cooling of the battery (e.g., when the temperature of the batter 206 is above a high temperature threshold). In some examples, the thermal management circuitry 204 activates cooling technology such as, for example, forced air cooling (e.g., fans), liquid cooling, and/or thermoelectric cooling. In some examples, the thermal management of the battery 206 includes passive cooling technology that does not consume additional energy. Passive cooling technology includes heat pipes, heat sinks, phase change materials, etc. To heat the battery 206, the charge control circuitry 202 uses temperature data from the thermal management circuitry 204 to adjust the charge request, which may allow the battery 206 to charge at a faster rate to produce heat.

The vehicle control unit 200 communicates the charge request, as adjusted by the charge control circuitry 202 to the communication circuitry 250 of the mobile energy unit 102. The mobile energy unit 102 supplies power from the power source 252 to the electric vehicle 100 via the plug 110 and port 112 in accordance with the charge request. The charge control circuitry 202, thermal management circuitry 204, and battery management circuitry 208 can operate continuously to dynamically adjust the charge request based on present and/or future or target operation of the work functions 210 and/or auxiliary loads 212 of electric vehicle 100 and/or of the status of the battery 206.

In some examples, the mobile energy unit 102 includes the object detection circuitry 254. For example, the mobile energy unit 102 may be virtually hitched to the electric vehicle 100. The object detection circuitry 254 can leverage sensors to identify a location and/or position of the electric vehicle 100. Based on the location and/or position of the electric vehicle 100, the mobile energy unit 102 can move to be in proximity to the electric vehicle 100 so that the mobile energy unit 102 is available for a charging sessions. The mobile energy unit 102 may use the object detection circuitry 254 to follow the path and/or the speed of the electric vehicle 100. The object detection circuitry 254 also may be used to identify obstacles that the mobile energy unit 102 can navigate around. Thus, in some examples, the mobile energy unit 102 can automatically move about the work site.

In some examples, the charge control circuitry 202 obtains or receives an available charge current from the mobile device 102. The available charge current is the charge current that is available from the power source 252. If the available charge current is less than the charge request, the vehicle control unit 200 may reduce power to, restrict function of, derate, or shut down one or more of the work functions 210 and/or auxiliary loads 212 of the electric vehicle 100 so that the battery 206 can charge more quickly without the work functions 210 and/or auxiliary loads 212 consuming energy. In some examples, if the available charge current from the power source 252 is greater than the charge request, the work functions 210 and/or auxiliary loads 212 of the electric vehicle 100 operate without restriction. In some examples, the work functions 210 and/or auxiliary loads 212 are powered directly from the power source 252 (i.e., from an external power source). In some examples, the work functions 210 and/or auxiliary loads 212 are powered while simultaneously charging the battery 206.

FIG. 2 is a block diagram of an example implementation of the electric vehicle 100 and the mobile energy unit 102 of FIG. 1 to do charge the electric vehicle 100. The electric vehicle 100 and/or the mobile energy unit 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the electric vehicle 100 and/or the mobile energy unit 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

Figure 3:
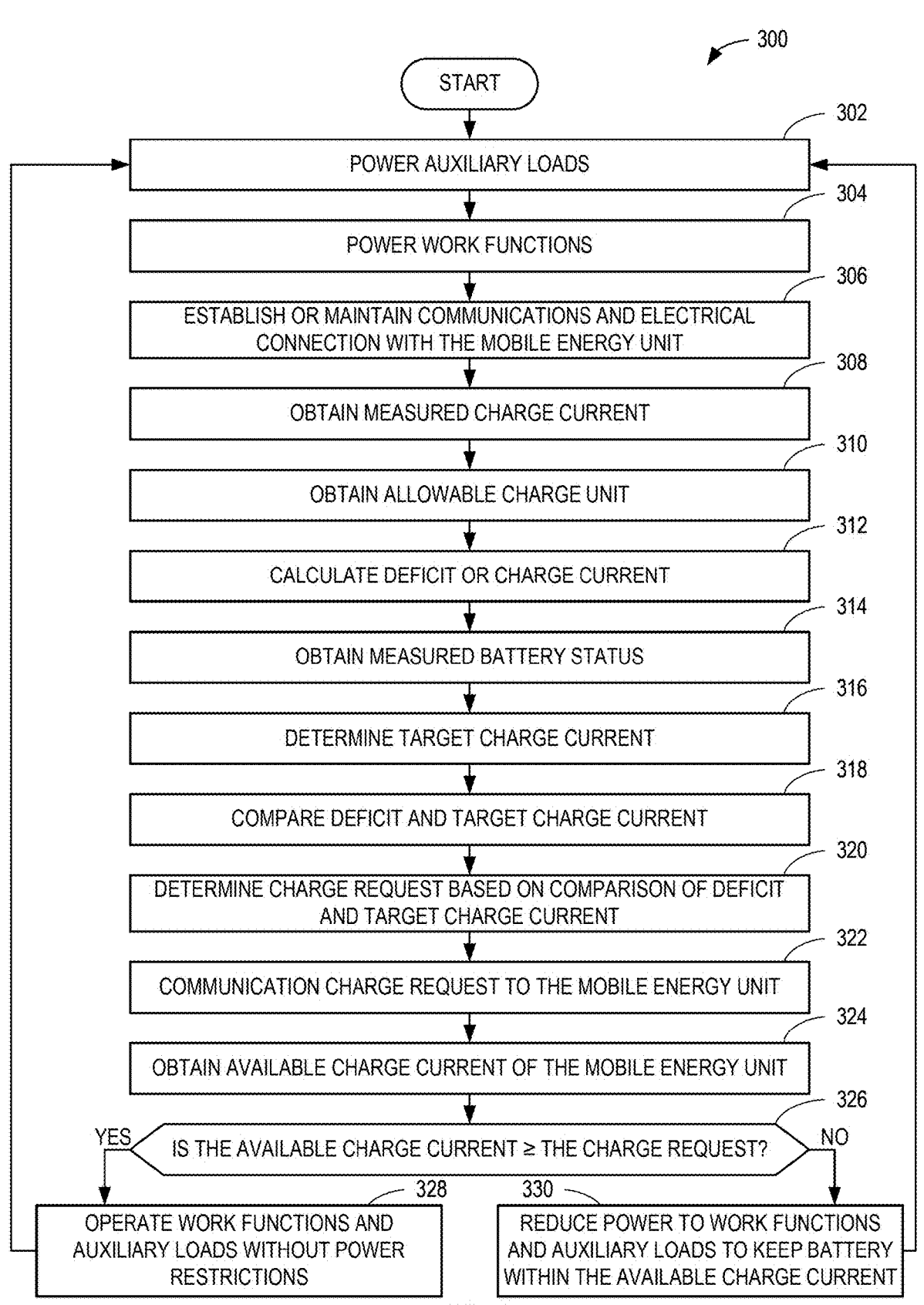
FIG. 3 is a flowchart representative of example machine readable instructions and/or example operations that may be executed, instantiated, and/or performed by example programmable circuitry to implement the electric vehicle of FIG. 2.

In some examples, the vehicle control unit 200, the charge control circuitry 202, the thermal management circuitry 204, and/or the battery management circuitry 208 are instantiated by programmable circuitry executing vehicle charging instructions and/or configured to perform operations such as those represented by the flowchart(s) of FIG. 3.

In some examples, the electric vehicle 100 includes means for determining a charge request the electric vehicle 100. For example, the means for determining may be implemented by the charge control circuitry 202. In some examples, the charge control circuitry 202 may be instantiated by programmable circuitry such as the example programmable circuitry 412 of FIG. 4. For instance, the charge control circuitry 202 may be instantiated by the example microprocessor 500 of FIG. 5 executing machine executable instructions such as those implemented by at least blocks 308-330 of FIG. 3. In some examples, the charge control circuitry 202 may be instantiated by hardware logic circuitry, which may be implemented by an ASIC, XPU, or the FPGA circuitry 600 of FIG. 6 configured and/or structured to perform operations corresponding to the machine readable instructions. Additionally or alternatively, the charge control circuitry 202 may be instantiated by any other combination of hardware, software, and/or firmware. For example, the charge control circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the electric vehicle 100 and/or the mobile energy unit 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example vehicle control unit 200, the example charge control circuitry 202, the example thermal management circuitry 204, and/or the example battery management circuitry 206 of the electric vehicle 100 and the example communication circuitry 250 and the example object detection circuitry 254 of the mobile energy unit 102, may be implemented by hardware alone or by hardware in combination with software and/or firmware. Thus, for example, any of the example vehicle control unit 200, the example charge control circuitry 202, the example thermal management circuitry 204, and/or the example battery management circuitry 206 of the electric vehicle 100 and the example communication circuitry 250 and the example object detection circuitry 254 of the mobile energy unit 102 could be implemented by programmable circuitry in combination with machine readable instructions (e.g., firmware or software), processor circuitry, analog circuit(s), digital circuit(s), logic circuit(s), programmable processor (s), programmable microcontroller(s), graphics processing unit(s) (GPU(s)), digital signal processor(s) (DSP(s)), ASIC (s), programmable logic device(s) (PLD(s)), and/or field programmable logic device(s) (FPLD(s)) such as FPGAs. Further still, the example electric vehicle 100 and/or the mobile energy unit 102 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine readable instructions, which may be executed by programmable circuitry to implement and/or instantiate aspects of the electric vehicle 100 and/or the mobile energy unit 102 of FIG. 2 and/or representative of example operations which may be performed by programmable circuitry to implement and/or instantiate aspects of the electric vehicle 100 and/or the mobile energy unit 102 of FIG. 2, are shown in FIG. 3. The machine readable instructions may be one or more executable programs or portion(s) of one or more executable programs for execution by programmable circuitry such as the programmable circuitry 412 shown in the example processor platform 400 discussed below in connection with FIG. 4 and/or may be one or more function(s) or portion(s) of functions to be performed by the example programmable circuitry (e.g., an FPGA) discussed below in connection with FIGS. 5 and/or 6. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 3, many other methods of implementing aspects of the electric vehicle 100 and/or the mobile energy unit 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 3 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 3 is a flowchart representative of example machine readable instructions and/or example operations 300 that may be executed, instantiated, and/or performed by programmable circuitry to determine and communicate a charge request for a battery of an electric vehicle. The example machine-readable instructions and/or the example operations 300 of FIG. 3 include the vehicle control unit 200 powers the auxiliary loads 212 of the electric vehicle 100 (block 302). The vehicle control unit 200 powers the work functions 210 of the electric vehicle 100 (block 304). The vehicle unit 100 also establishes or maintains communication and electrical connections with the mobile energy unit 102 (block 306).

The charge control circuitry 202 accesses, retrieves, receives, and/or otherwise obtains the measured charge current of the battery 206 from the battery management circuitry 208 (block 308). The charge control circuitry 202 accesses, retrieves, receives, and/or otherwise obtains the allowable charge current of the battery 206 from the battery management circuitry 208 (block 310).

The charge control circuitry 202 determines or calculates the deficit of charge current (block 312). The deficit of charge current is the difference between the measure charge current and the allowable charge current. The charge control circuitry 202 accesses, retrieves, receives, and/or otherwise obtains data related to the measured battery status of the battery 206 from the battery management circuitry 208 (block 314). The battery status includes data related to the SOC of the battery 206, the voltage of the battery 206, and/or the temperature of the battery 206. The charge control circuitry 202 determines the target charge current for the battery 206 based on the battery status data (block 316).

The charge control circuitry 202 compares the deficit and the target charge current (block 318). The charge control circuitry 202 sets or determines the charge request based on the comparison of the deficit and the target charge current (block 320). The charge control circuitry 202 sets the lower, lesser, or the minimum of the deficit or the target charge current as the charge request. The vehicle control unit 200 communicates the charge request to the mobile energy unit 102 (block 322).

The charge control circuitry 202 accesses, retrieves, receives, and/or otherwise obtains the available charge current of the mobile energy unit 102 (block 324. For example, the charge control circuitry 202 obtains the amount of energy or charge current available from the power source 252. The charge control circuitry 202 compares the available charge current with the charge request (block 326). If and/or when the available charge current is greater than or equal to the charge request (block 326: YES), the vehicle control unit 200 operates the work functions 210 and auxiliary loads 212 without restriction (block 328). The process 300 continues with the vehicle control unit powering the auxiliary loads 212 (block 302) and the work functions (block 304).

If and/or when the available charge current is less than charge request (block 326: NO), the vehicle control unit 200 reduces power to the work functions 210 and the auxiliary loads 212 to keep the battery 206 within the available charge current (block 330). In other words, the vehicle control unit 200 operates the work functions 210 and auxiliary loads 212 with restriction. The process 300 continues with the vehicle control unit powering the auxiliary loads 212 (block 302) and the work functions (block 304) (e.g., with restriction).

Figure 4:
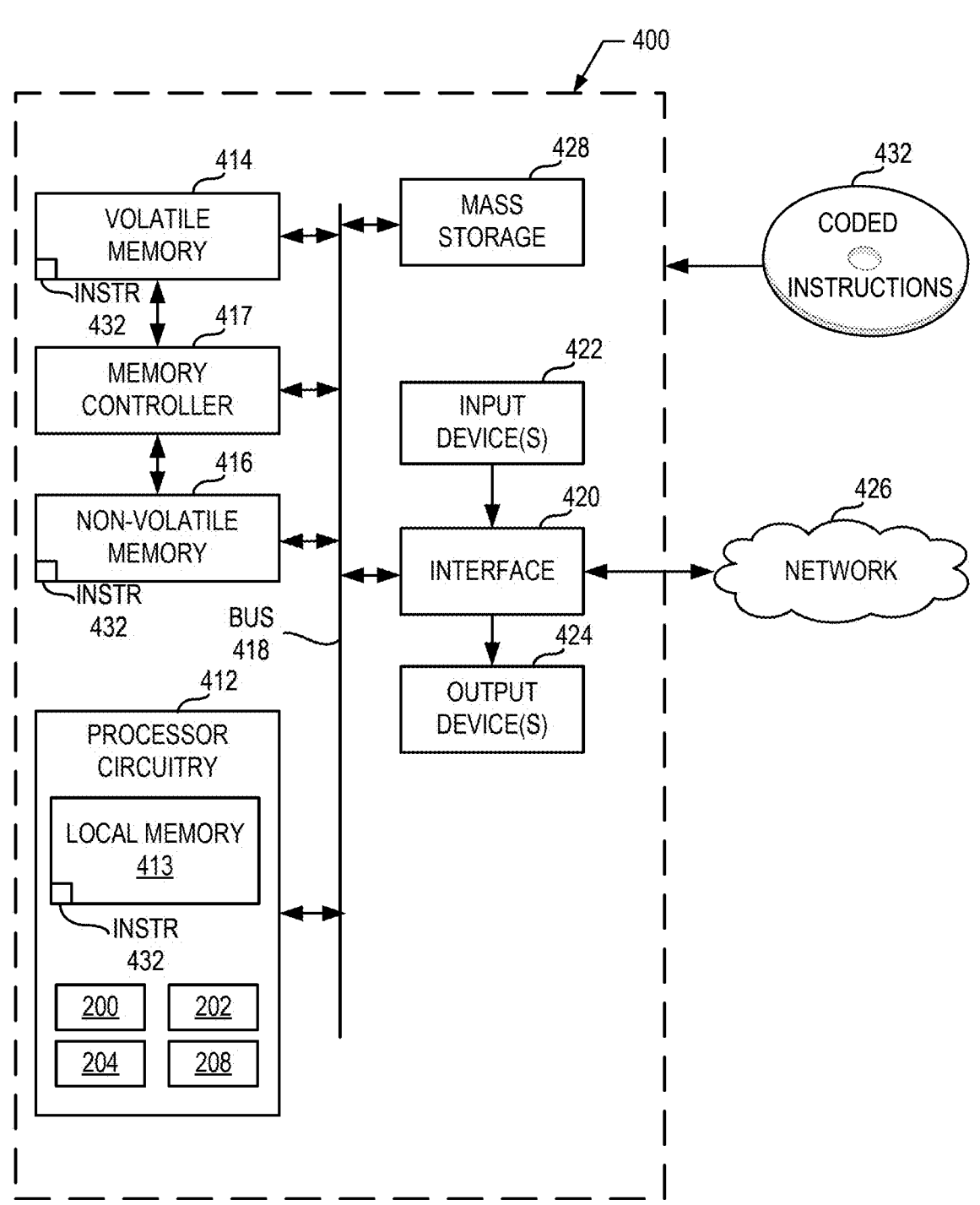
FIG. 4 is a block diagram of an example processing platform including programmable circuitry structured to execute, instantiate, and/or perform the example machine readable instructions and/or perform the example operations of FIG. 3 to implement the electric vehicle of FIG. 2.

FIG. 4 is a block diagram of an example programmable circuitry platform 400 structured to execute and/or instantiate the example machine-readable instructions and/or the example operations of FIG. 3 to implement aspects of the electric vehicle 100 and/or the mobile energy unit 102 of FIG. 2. The programmable circuitry platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or other wearable device, or any other type of computing and/or electronic device.

The programmable circuitry platform 400 of the illustrated example includes programmable circuitry 412. The programmable circuitry 412 of the illustrated example is hardware. For example, the programmable circuitry 412 can be implemented by one or more integrated circuits, logic circuits, FPGAS, microprocessors, CPUs, GPUs, DSPs, and/or microcontrollers from any desired family or manufacturer. The programmable circuitry 412 may be implemented by one or more semiconductor based (e.g., silicon based) devices. When the programmable circuitry platform 400 represents a platform in the electric vehicle 100, the programmable circuitry 412 implements the vehicle control unit 200, the charge control circuitry 202, the thermal management circuitry 204, and/or the battery management circuitry 206. When the programmable circuitry platform 400 represents a platform in the mobile energy unit 102, the programmable circuitry 412 implements the communication circuitry 250 and/or the object detection circuitry 254.

The programmable circuitry 412 of the illustrated example includes a local memory 413 (e.g., a cache, registers, etc.). The programmable circuitry 412 of the illustrated example is in communication with main memory 414, 416, which includes a volatile memory 414 and a non-volatile memory 416, by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. In some examples, the memory controller 417 may be implemented by one or more integrated circuits, logic circuits, microcontrollers from any desired family or manufacturer, or any other type of circuitry to manage the flow of data going to and from the main memory 414, 416.

The programmable circuitry platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user (e.g., a human user, a machine user, etc.) to enter data and/or commands into the programmable circuitry 412. The input device(s) 422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 400 of the illustrated example also includes one or more mass storage discs or devices 428 to store firmware, software, and/or data. Examples of such mass storage discs or devices 428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 432, which may be implemented by the machine readable instructions of FIG. 3, may be stored in the mass storage device 428, in the volatile memory 414, in the non-volatile memory 416, and/or on at least one non-transitory computer readable storage medium such as a CD or DVD which may be removable.

Figure 5:
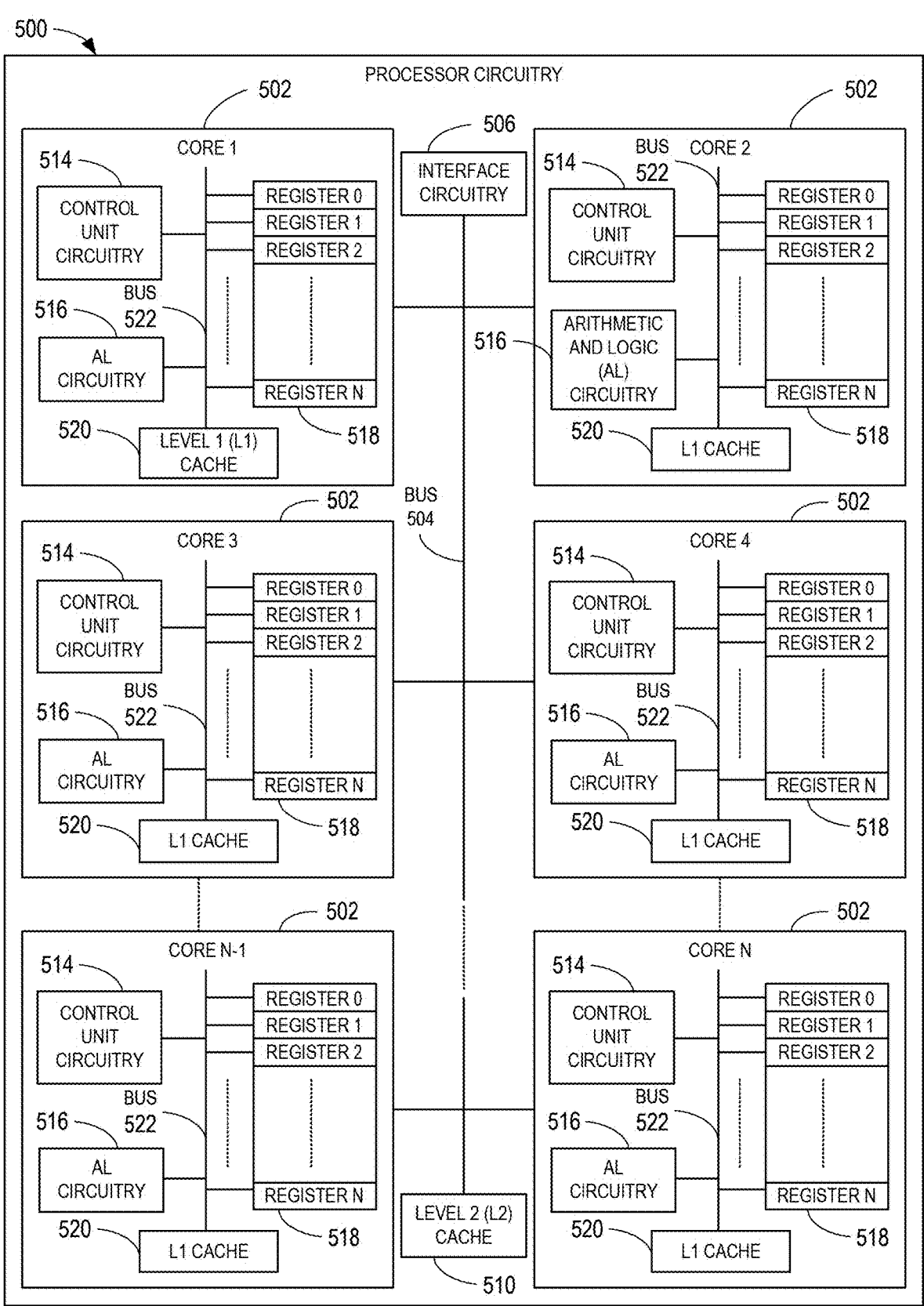
FIG. 5 is a block diagram of an example implementation of the programmable circuitry of FIG. 4.

FIG. 5 is a block diagram of an example implementation of the programmable circuitry 412 of FIG. 4. In this example, the programmable circuitry 412 of FIG. 4 is implemented by a microprocessor 500. For example, the microprocessor 500 may be a general-purpose microprocessor (e.g., general-purpose microprocessor circuitry). The microprocessor 500 executes some or all of the machine-readable instructions of the flowchart of FIG. 3 to effectively instantiate the circuitry of FIG. 2 as logic circuits to perform operations corresponding to those machine readable instructions. In some such examples, the circuitry of FIG. 2 is instantiated by the hardware circuits of the microprocessor 500 in combination with the machine-readable instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIG. 3.

The cores 502 may communicate by a first example bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating-point operations. In yet other examples, the AL circuitry 516 may include first AL circuitry that performs integer-based operations and second AL circuitry that performs floating-point operations. In some examples, the AL circuitry 516 may be referred to as an Arithmetic Logic Unit (ALU).

The registers 518 are semiconductor-based structures to store data and/or instructions such as results of one or more of the operations performed by the AL circuitry 516 of the corresponding core 502. For example, the registers 518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure, such as by being distributed throughout the core 502 to shorten access time. The second bus 522 may be implemented by at least one of an I2C bus, a SPI bus, a PCI bus, or a PCIe bus.

Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages.

The microprocessor 500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 500, in the same chip package as the microprocessor 500 and/or in one or more separate packages from the microprocessor 500.

Figure 6:
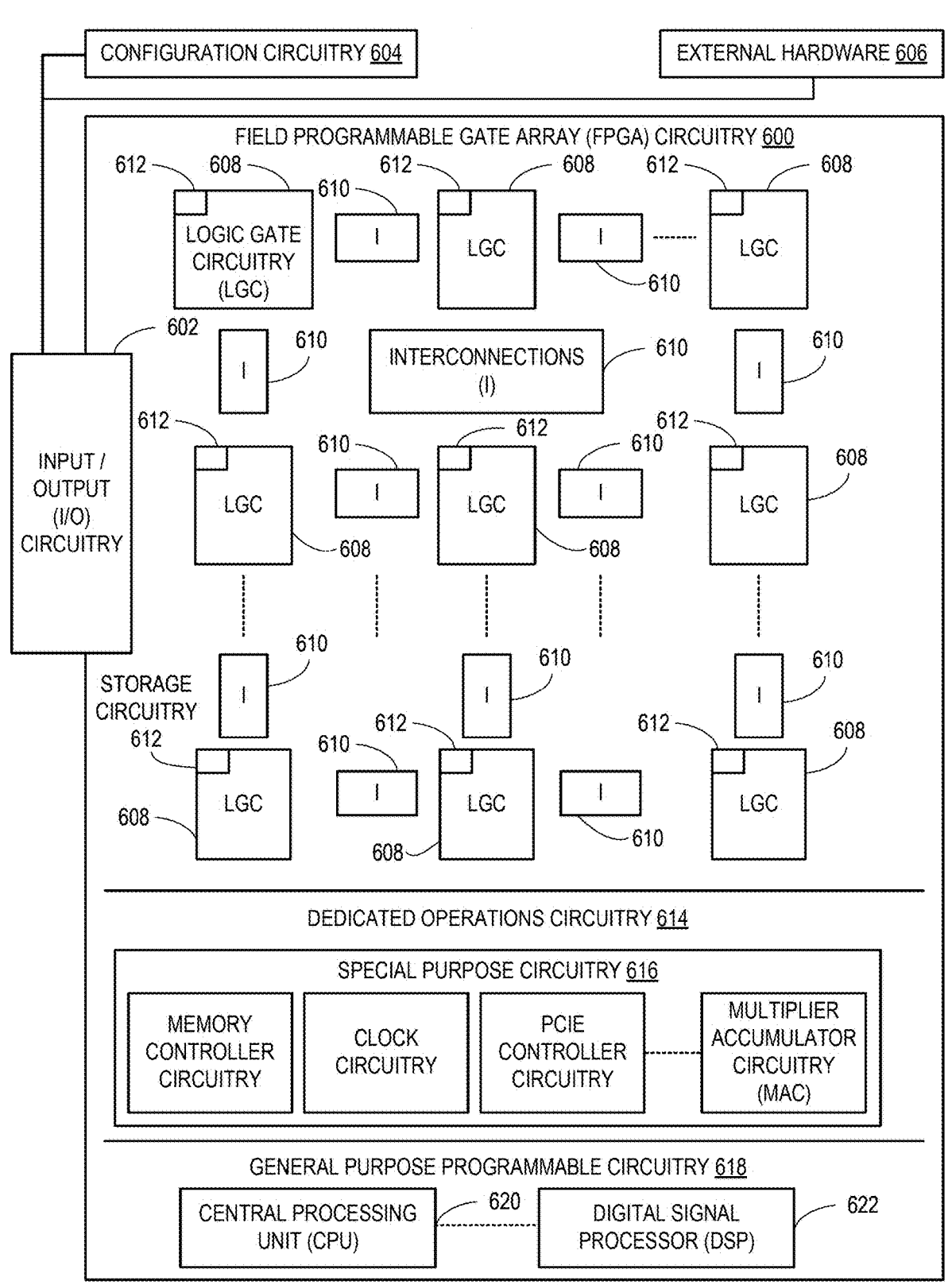
FIG. 6 is a block diagram of another example implementation of the programmable circuitry of FIG. 4.

FIG. 6 is a block diagram of another example implementation of the programmable circuitry 412 of FIG. 4. In this example, the programmable circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 500 of FIG. 5 described above (which is a general purpose device that may be programmed to execute some or all of the machine readable instructions represented by the flowchart of FIG. 3 but whose interconnections and logic circuitry are fixed once fabricated), the FPGA circuitry 600 of the example of FIG. 6 includes interconnections and logic circuitry that may be configured, structured, programmed, and/or interconnected in different ways after fabrication to instantiate, for example, some or all of the operations/ functions corresponding to the machine readable instructions represented by the flowchart of FIG. 3. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 3. As such, the FPGA circuitry 600 may be configured and/or structured to effectively instantiate some or all of the operations/functions corresponding to the machine readable instructions of the flowchart of FIG. 3 as dedicated logic circuits to perform the operations/functions corresponding to those software instructions in a dedicated manner analogous to an ASIC. Therefore, the FPGA circuitry 600 may perform the operations/functions corresponding to the some or all of the machine readable instructions of FIG. 3 faster than the general-purpose microprocessor can execute the same.

In the example of FIG. 6, the FPGA circuitry 600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 600 of FIG. 6 may access and/or load the binary file to cause the FPGA circuitry 600 of FIG. 6 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 600 of FIG. 6 may access and/or load the binary file to cause the FPGA circuitry 600 of FIG. 6 to be configured and/or structured to perform the one or more operations/ functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 600 of FIG. 6 to cause configuration and/or structuring of the FPGA circuitry 600 of FIG. 6, or portion(s) thereof.

The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain a binary file, which may be implemented by a bit stream, data, and/or machine-readable instructions, to configure the FPGA circuitry 600, or portion(s) thereof. In some such examples, the configuration circuitry 604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 606 may be implemented by external hardware circuitry. For example, the external hardware 606 may be implemented by the microprocessor 500 of FIG. 5.

The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations/functions that may correspond to at least some of the machine readable instructions of FIG. 3 and/or other desired operations. The logic gate circuitry 608 shown in FIG. 6 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations/ functions. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example dedicated operations circuitry 614. In this example, the dedicated operations circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the programmable circuitry 412 of FIG. 4, many other approaches are contemplated. For example, FPGA circuitry may include an on-board CPU, such as one or more of the example CPU 620 of FIG. 5. Therefore, the programmable circuitry 412 of FIG. 4 may additionally be implemented by combining at least the example microprocessor 500 of FIG. 5 and the example FPGA circuitry 600 of FIG. 6. In some such hybrid examples, one or more cores 502 of FIG. 5 may execute a first portion of the machine readable instructions represented by the flowchart of FIG. 3 to perform first operation(s)/function(s), the FPGA circuitry 600 of FIG. 6 may be configured and/or structured to perform second operation(s)/function(s) corresponding to a second portion of the machine readable instructions represented by the flowcharts of FIG. 3, and/or an ASIC may be configured and/or structured to perform third operation(s)/function(s) corresponding to a third portion of the machine readable instructions represented by the flowchart of FIG. 3.

It should be understood that some or all of the circuitry of FIG. 2 may, thus, be instantiated at the same or different times. For example, same and/or different portion(s) of the microprocessor 500 of FIG. 5 may be programmed to execute portion(s) of machine-readable instructions at the same and/or different times. In some examples, same and/or different portion(s) of the FPGA circuitry 600 of FIG. 6 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 500 of FIG. 5 may execute machine readable instructions in one or more threads executing concurrently and/or in series. In some examples, the FPGA circuitry 600 of FIG. 6 may be configured and/or structured to carry out operations/functions concurrently and/or in series. Moreover, in some examples, some or all of the circuitry of FIG. 2 may be implemented within one or more virtual machines and/or containers executing on the microprocessor 500 of FIG. 5.

In some examples, the programmable circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the programmable circuitry 412 of FIG. 4, which may be in one or more packages. For example, the XPU may include a CPU (e.g., the microprocessor 500 of FIG. 5, the CPU 620 of FIG. 6, etc.) in one package, a DSP (e.g., the DSP 622 of FIG. 6) in another package, a GPU in yet another package, and an FPGA (e.g., the FPGA circuitry 600 of FIG. 6) in still yet another package.

Figure 7:
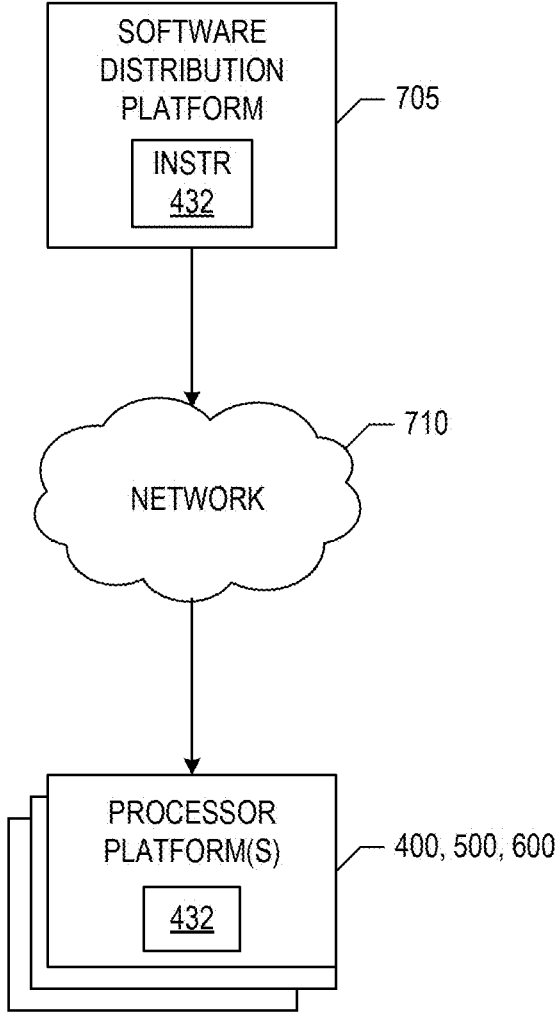
FIG. 7 is a block diagram of an example software, firmware, and/or instructions distribution platform (e.g., one or more servers) to distribute software, instructions, and/or firmware (e.g., corresponding to the example machine readable instructions of FIG. 3) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine readable instructions 432 of FIG. 4 to other hardware devices (e.g., hardware devices owned and/or operated by third parties from the owner and/or operator of the software distribution platform) is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine readable instructions 432, which may correspond to the example machine readable instructions of FIG. 3, as described above. The one or more servers of the example software distribution platform 705 are in communication with an example network 710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 432 from the software distribution platform 705. For example, the software, which may correspond to the example machine readable instructions of FIG. 3, may be downloaded to the example programmable circuitry platform 400, which is to execute the machine readable instructions 432 to implement aspects of the electric vehicle 100 and/or the mobile energy unit 102. In some examples, one or more servers of the software distribution platform 705 periodically offer, transmit, and/or force updates to the software (e.g., the example machine readable instructions 432 of FIG. 4) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that determine a charge request for an electric vehicle from a mobile energy unit or mobile charging station. Disclosed systems, apparatus, articles of manufacture, and methods improve the efficiency of using a computing device by request a charge based on battery status and target workload functions of the electric vehicle. Disclosed systems, apparatus, articles of manufacture, and methods are accordingly directed to one or more improvement(s) in the operation of a machine such as a computer or other electronic and/or mechanical device.

Disclosed systems, apparatus, articles of manufacture, and methods improve the efficiency of using an electric vehicle by enable the electric vehicle to be charged at a work site, which decreases downtime and enables a greater output by the electric vehicle. Example disclosed herein also enable the electric vehicle to carry a smaller battery, while allowing for continual, periodic, or on demand recharging of the battery. In some examples, the examples disclosed herein enable the electric vehicle to have no battery on board where the power is completely supplied by the mobile energy unit. Electric vehicles with smaller batteries or no battery at all can have smaller or compact form factors, which can enable the electric vehicle to operate in smaller spaces.

Examples disclosed herein include an external charger that has faster communication to enable dynamic control (current requested inputs, voltage limit inputs, current sensed outputs, voltage sensed outputs, current limit outputs, etc.). Communication protocols include higher speed communications that can travel more distance between the electric vehicle and the mobile energy unit.

Examples disclosed herein include a ruggedized E-Power inlet (e.g., port) and plug that can also be backward compatible with the CCS1 plug standard, which allows normal stationary charging or rugged in-field portable power and leverages existing PLC communication.

Examples disclosed herein include an additional power path for managing the power to work functions (e.g., vehicle controls regulate the power split from the on-board battery and external power supply).

Examples disclosed herein enable electric vehicles to have extended field operation. Work functions and auxiliary loads can be powered without depleting onboard energy. The battery can be recharged in the field while the electric vehicle is in operation. The battery can be recharged at the same time as the work functions and auxiliary loads operate and consumer power.

Example systems, apparatus, articles of manufacture, and methods have been disclosed that determine a charge request for an electric vehicle from a mobile energy unit or mobile charging station. Example 1 includes a vehicle that includes a battery, machine readable instructions, and at least one processor circuit to be programmed by the machine-readable instructions to: calculate a deficit of charge current of the battery based on an allowable charge current and a measured charge current; determine a target charge current based on a status of the battery; determine a charge request based on the deficit and the target charge current; and communicate the charge request to a mobile energy unit.

Example 2 includes the vehicle of Example 1, wherein the at least one processor circuit is to determine the charge request based on which of the deficit and the target charge current is less.

Example 3 includes the vehicle of either of Examples 1 or 2, wherein the battery status includes a percentage of capacity of the battery, a voltage limit of the battery, and a temperature of the battery.

Example 4 includes the vehicle of any of Examples 1-3, wherein the at least one processor circuit is to compare an available charge current of the mobile energy unit to the charge request.

Example 5 includes the vehicle of Example 4, wherein the at least one processor circuit is to restrict a work function of the vehicle when the available charge current is less than the charge request.

Example 6 includes the vehicle of Example 4, wherein the at least one processor circuit is to reduce power allocated to a work function of the vehicle when the available charge current is less than the charge request.

Example 7 includes the vehicle of any of Examples 1-6, wherein the at least one processor circuit is to exchange location information with the mobile energy unit.

Example 8 includes the vehicle of any of Examples 1-7, wherein the vehicle is construction or agricultural machinery.

Example 9 includes at least one non-transitory machine readable storage medium that includes instructions to cause at least one processor circuit to at least: calculate a deficit of charge current of a battery of a vehicle based on an allowable charge current and a measured charge current; determine a target charge current based on a status of the battery; determine a charge request based on the deficit and the target charge current; and communicate the charge request to an external power source.

Example 10 includes the at least one non-transitory machine-readable medium of Example 9, wherein the instructions to cause at least one processor circuit to determine the charge request based on which of the deficit and the target charge current is less.

Example 11 includes the at least one non-transitory machine-readable medium of either of Examples 9 or 10, wherein the battery status includes two or more of a percentage of capacity of the battery, a voltage limit of the battery, or a temperature of the battery.

Example 12 includes the at least one non-transitory machine-readable medium of any of Examples 9-11, wherein the instructions to cause at least one processor circuit to compare an available charge current of the external power source to the charge request.

Example 13 includes the at least one non-transitory machine-readable medium of Example 12, wherein the at least one processor circuit is to restrict a work function of the vehicle when the available charge current is less than the charge request.

Example 14 includes the at least one non-transitory machine-readable medium of Example 12, wherein the at least one processor circuit is to limit power allocation to a work function of the vehicle when the available charge current is less than the charge request.

Example 15 includes the at least one non-transitory machine-readable medium of any of Examples 9-14, wherein the at least one processor circuit is to exchange location information with the external power source.

Example 16 includes a system that includes a vehicle including a battery, one or more work functions to consume charge from the battery, machine readable instructions, and at least one processor circuit to be programmed by the machine-readable instructions to: calculate a deficit of charge current of the battery based on an allowable charge current and a measured charge current into terminals of the battery; determine a target charge current based on a status of the battery; and determine a charge request based on the deficit and the target charge current. The system of Example 16 also includes a mobile energy unit coupled to the vehicle to provide energy to the vehicle based on the charge request.

Example 17 includes the system of Example 16, wherein the vehicle has a port and the mobile energy unit has a plug couplable with the port, the plug including external bracing.

Example 18 includes the system of either of Examples 16 or 17, wherein the mobile energy unit is tethered to the vehicle.

Example 19 includes the system of any of Examples 16-18, where the mobile energy unit is self-propelled, and the vehicle and mobile energy unit exchange location information for the mobile energy unit to follow the vehicle.

Example 20 includes the system of any of Examples 16-19, wherein the mobile energy unit is self-propelled and includes object detection circuitry to follow the vehicle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A vehicle comprising:
a battery;
machine-readable instructions; and
at least one processor circuit to be programmed by the machine-readable instructions to:
    calculate a deficit of charge current of the battery based on an allowable charge current and a measured charge current;
    determine a target charge current based on a status of the battery;
    determine a charge request based on the deficit and the target charge current;
    communicate the charge request to a mobile energy unit;
    derate auxiliary loads while the battery is recharged; and
    enable continuation of work functions while the battery is recharged.

2. The vehicle of claim 1, wherein the at least one processor circuit is to be programmed by the machine-readable instructions to determine the charge request based on which of the deficit and the target charge current is less.

3. The vehicle of claim 1, wherein the battery status includes a percentage of capacity of the battery, a voltage limit of the battery, and a temperature of the battery.

4. The vehicle of claim 1, wherein the at least one processor circuit is to be programmed by the machine-readable instructions to compare an available charge current of the mobile energy unit to the charge request.

5. The vehicle of claim 4, wherein the at least one processor circuit is to be programmed by the machine-readable instructions to restrict one or more of the work functions of the vehicle when the available charge current is less than the charge request.

6. The vehicle of claim 4, wherein the at least one processor circuit is to be programmed by the machine-readable instructions to reduce power allocated to one or more of the work functions of the vehicle when the available charge current is less than the charge request.

7. The vehicle of claim 1, wherein the at least one processor circuit is to be programmed by the machine-readable instructions to exchange location information with the mobile energy unit.

8. The vehicle of claim 1, wherein the vehicle is construction or agricultural machinery.

9. At least one non-transitory machine readable storage medium comprising instructions to cause at least one processor circuit to at least:
    calculate a deficit of charge current of a battery of a vehicle based on an allowable charge current and a measured charge current;
    determine a target charge current based on a status of the battery;
    determine a charge request based on the deficit and the target charge current;
    communicate the charge request to an external power source; and
    reallocate power distribution during recharging of the battery by derating auxiliary loads and enabling operation work functions while the battery is recharged.

10. The at least one non-transitory machine-readable medium of claim 9, wherein the instructions to cause at least one processor circuit to determine the charge request based on which of the deficit and the target charge current is less.

11. The at least one non-transitory machine-readable medium of claim 9, wherein the battery status includes two or more of a percentage of capacity of the battery, a voltage limit of the battery, or a temperature of the battery.

12. The at least one non-transitory machine-readable medium of claim 9, wherein the instructions to cause at least one processor circuit to compare an available charge current of the external power source to the charge request.

13. The at least one non-transitory machine-readable medium of claim 12, wherein the at least one processor circuit is to restrict a work function of the vehicle when the available charge current is less than the charge request.

14. The at least one non-transitory machine-readable medium of claim 12, wherein the at least one processor circuit is to limit power allocation to at least one of the work functions of the vehicle when the available charge current is less than the charge request.

15. The at least one non-transitory machine-readable medium of claim 9, wherein the at least one processor circuit is to exchange location information with the external power source.

16. A system comprising:
a vehicle including:
a battery;
one or more work functions to consume charge from the battery;
machine readable instructions; and
at least one processor circuit to be programmed by the machine-readable instructions to:
    calculate a deficit of charge current of the battery based on an allowable charge current and a measured charge current into terminals of the battery;
    determine a target charge current based on a status of the battery; and
    determine a charge request based on the deficit and the target charge current;
    balance load distribution among the one or more work functions, one or more auxiliary loads, and charging of the battery during a charging session to maintain operation of the one or more work functions during the charging session; and
a mobile energy unit coupled to the vehicle to provide energy to the vehicle based on the charge request.

17. The system of claim 16, wherein the vehicle has a port and the mobile energy unit has a plug couplable with the port, the plug including external bracing to ruggedize a connection of the plug and port during performance of the one or more work functions.

18. The system of claim 16, wherein the mobile energy unit is tethered to the vehicle.

19. The system of claim 16, where the mobile energy unit is self-propelled, and the vehicle and mobile energy unit exchange location information for the mobile energy unit to follow the vehicle.

20. The system of claim 16, wherein the mobile energy unit is self-propelled and includes object detection circuitry to follow the vehicle.

* * * * *